(12) United States Patent
Takatori et al.

(10) Patent No.: US 7,864,668 B2
(45) Date of Patent: Jan. 4, 2011

(54) COMMUNICATION APPARATUS AND PATH SWITCHING METHOD

(75) Inventors: Ko Takatori, Kawasaki (JP); Ken Igarashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 12/320,658

(22) Filed: Jan. 30, 2009

(65) Prior Publication Data

US 2009/0290487 A1    Nov. 26, 2009

(30) Foreign Application Priority Data

May 26, 2008  (JP) .............................. 2008-136598

(51) Int. Cl.
*H04L 12/26* (2006.01)
(52) U.S. Cl. ................. 370/224; 370/228; 370/245
(58) Field of Classification Search .................. None
See application file for complete search history.

(56) References Cited

U.S. PATENT DOCUMENTS 6,130,764 A    10/2000   Taniguchi

| 2002/0181392 | A1* | 12/2002 | Okuno ........................ 370/216 |
|---|---|---|---|
| 2003/0117944 | A1* | 6/2003 | Donoghue et al. .......... 370/216 |
| 2006/0056414 | A1* | 3/2006 | Elie-Dit-Cosaque et al. .......................... 370/392 |
| 2006/0209681 | A1 | 9/2006 | Yamamoto |
| 2006/0209683 | A1* | 9/2006 | Nishimura .................. 370/222 |
| 2009/0141622 | A1* | 6/2009 | Bitar .......................... 370/225 |

FOREIGN PATENT DOCUMENTS

JP    11-127183    5/1999
JP    2006-262291    9/2006

* cited by examiner

*Primary Examiner*—Min Jung
(74) *Attorney, Agent, or Firm*—Staas & Halsey LLP

(57) ABSTRACT

In a communication apparatus on a network having ring topology and connecting plural communication apparatuses such that adjacent communication apparatuses are connected through plural lines, a first detecting unit detects failure occurring in a line included in a relay path set between the communication apparatus and another communication apparatus on the network. When the first detecting unit detects failure, a switching unit switches the relay path to a relay path connecting the communication apparatuses on the network in a direction opposite to the relay path originally set. A second detecting unit detects failure occurring in a line included in the relay path switched to by the switching unit; and when the second detecting unit detects failure, a resetting unit resets the relay path using a line where no failure has been detected.

6 Claims, 12 Drawing Sheets

COMMUNICATION APPARATUS AND PATH SWITCHING METHOD

CROSS REFERENCE TO RELATED APPLICATIONS

This application is based upon and claims the benefit of priority from the prior Japanese Patent Application No. 2008-136598, filed on May 26, 2008, the entire contents of which are incorporated herein by reference.

FIELD

The embodiments discussed herein are related to a communication apparatus and a path switching method for a ring network.

BACKGROUND

To improve network reliability, a communication system that provides a physical redundant route between arbitrary bridge devices on a ring network is used. In the ring network, the relay of a data frame through a given port is blocked to perform normal communication and prevent looping of the data frame.

As a result, a relay path between communication apparatuses is uniquely determined. When failure occurs in a line connecting communication apparatuses, the blocking point of the data frame is dynamically changed to restart communication using a path where no failure has occurred. Consequently, a relay path between the communication apparatuses is maintained even if a failure occurs (see, e.g., Japanese Patent No. 3285138).

With a primary aim of expanding band used in a ring network, a technology that connects plural lines (physical lines) between communication apparatuses and uses these lines as one logical line based on link aggregation (LA) specified in IEEE802.3ad is used.

In the link aggregation, when failure occurs in a line among plural lines connecting two communication apparatuses, a technology that performs logical switching by resetting the relay path using lines where no failure has occurred is disclosed in Japanese Laid-open Patent Application No. 2006-262291. According to the technology, the relay path between the communication apparatuses is maintained even if failure occurs.

However, the technology that dynamically changes the blocking point and switches the relay path to a path where no failure has occurred has a problem in that communication is completely disrupted when another failure occurs in the relay path after the switch. Therefore, there is a problem in that tolerance against multiple failures in the ring network is low.

According to the technology that performs logical switching by resetting the relay path using lines where no failure has occurred, since communication continues through fewer lines, communication speed in the relay path is reduced. Therefore, there is a problem in that band increased based on the link aggregation cannot be effectively exploited.

SUMMARY

According to an aspect of an embodiment, a communication apparatus on a network having ring topology and connecting a plurality of communication apparatuses such that adjacent communication apparatuses are connected through a plurality of lines, includes a first detecting unit that detects failure occurring in a line that is among the lines and included in a relay path set between the communication apparatus and a communication apparatus on the network; a switching unit that, when the first detecting unit detects failure, switches the relay path to a relay path connecting the communication apparatuses on the network in a direction opposite to the relay path originally set; a second detecting unit that detects failure occurring in a line included in the relay path switched to by the switching unit; and a resetting unit that, when the second detecting unit detects failure, resets the relay path using, among the lines, a line where no failure has been detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

Figure 1:
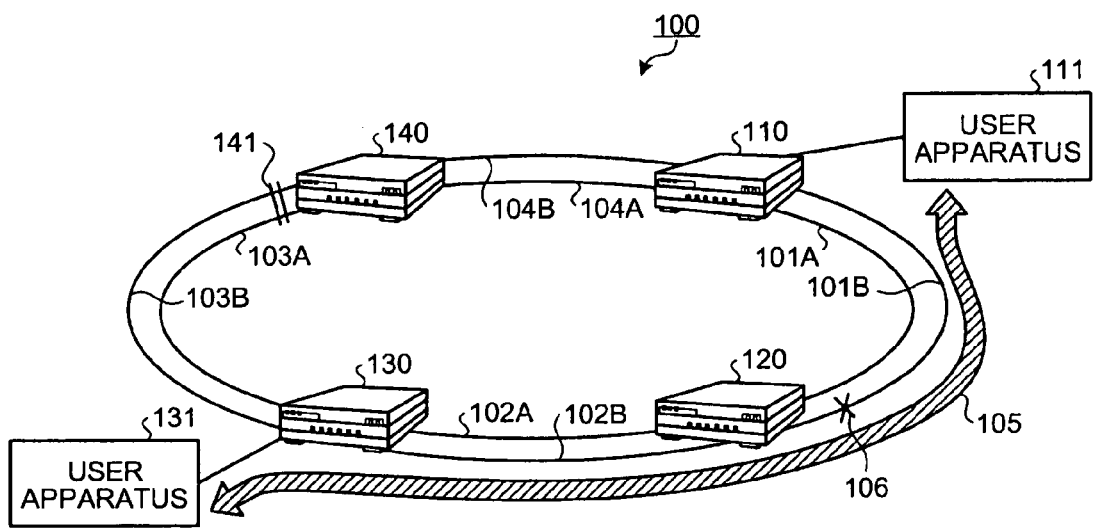
FIGS. 1 to 3 are schematic overviews of communication apparatuses according to a first embodiment.

FIG. 1 is a schematic overview of communication apparatuses according to a first embodiment. As depicted in FIG. 1, a network 100 is a ring network including a communication apparatus 110, a communication apparatus 120, a communication apparatus 130, and a communication apparatus 140 according to the first embodiment. The network 100 may be an optical network or an electrical network.

The communication apparatus 110, the communication apparatus 120, the communication apparatus 130, and the communication apparatus 140 are connected through plural lines treated as one transmission path. The communication apparatus 110, the communication apparatus 120, the communication apparatus 130, and the communication apparatus 140 perform link aggregation of logically treating the lines as one transmission path to transmit signals. An example where two lines are provided between each of the communication apparatuses will be explained.

Specifically, the communication apparatus 110 is connected with the communication apparatus 120 through a line 101A and a line 101B. The communication apparatus 120 is connected with the communication apparatus 130 through a line 102A and a line 102B. The communication apparatus 130 is connected with the communication apparatus 140 through a line 103A and a line 103B. The communication apparatus 140 is connected with the communication apparatus 110 through a line 104A and a line 104B.

When the network 100 is an optical network, the line 101A, the line 101B, the line 102A, the line 102B, the line 103A, the line 103B, the line 104A, and the line 104B are each optical fibers. When the network 100 is an electrical network, the line 101A, the line 101B, the line 102A, the line 102B, the line 103A, the line 103B, the line 104A, and the line 104B are each electrical lines.

A relay path is set between the communication apparatus 110 connected to a user apparatus 111 and the communication apparatus 130 connected to a user apparatus 131. In this example, the relay path is a path 105 that connects the communication apparatus 110 and the communication apparatus 130 through the communication apparatus 120. A relay path setting method will now be explained. The communication apparatus 110 transmits a signal supplied from the user apparatus 111 to both the communication apparatus 120 and the communication apparatus 140.

The communication apparatus 130 transmits a signal supplied from the user apparatus 131 to both the communication apparatus 120 and the communication apparatus 140. Signals transmitted between the user apparatus 111 and the user apparatus 131 are blocked in a path including the communication apparatus 140. In this example, as indicated by reference numeral 141, the communication apparatus 140 blocks signals transmitted between the user apparatus 111 and the user apparatus 131.

As a result, the relay path for the signals transmitted between the user apparatus 111 and the user apparatus 131 can be restricted to the path 105, thereby preventing the signals from being transmitted in a loop. The focus of the explanation will be the communication apparatus 110. The communication apparatus 110 detects failure occurring in the line 101A, the line 101B, the line 104A, and the line 104B.

It is assumed here that failure occurs in the line 101B as indicated by reference numeral 106. For example, the communication apparatus 110 detects failure in the line 101B when among control frames transmitted to and received from the communication apparatus 120 through the line 101A and the line 101B, a control frame transmitted and received through the line 101B cannot be transmitted and/or received.

Figure 2:
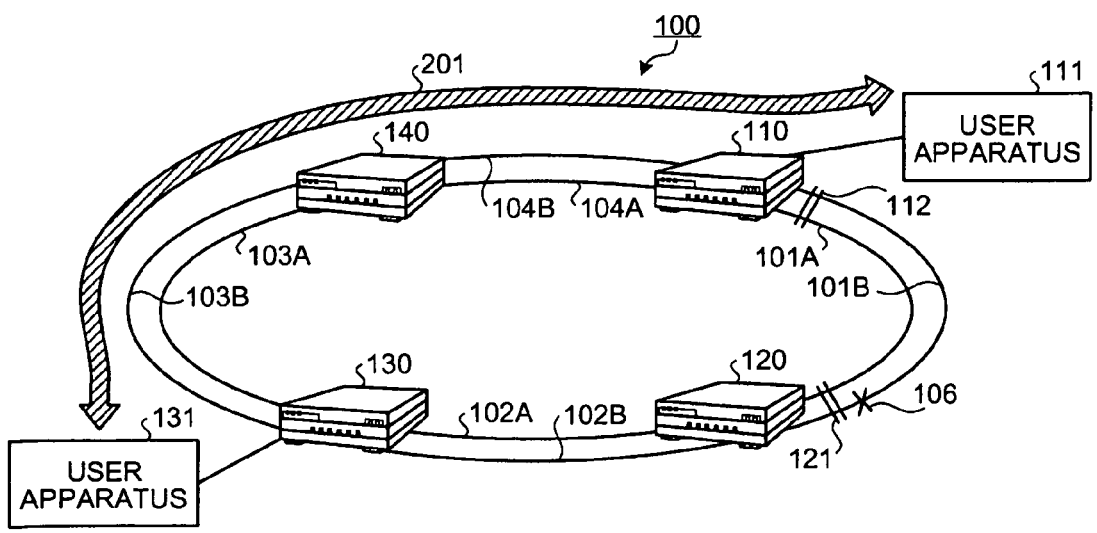

FIG. 2 is another schematic overview of communication apparatuses according to a first embodiment. As depicted in FIG. 2, the communication apparatus 110 having detected the failure in the line 101B switches the relay path to a path 201, in the network 100, in a direction opposite to that of the path 105 (see FIG. 1). The path 201 is a path connecting the communication apparatus 110 and the communication apparatus 130 through the communication apparatus 140.

Specifically, as indicated by the reference numeral 112, the communication apparatus 110 blocks signals transmitted between the user apparatus 111 and the user apparatus 131 in the path including the communication apparatus 120. The communication apparatus 110 transmits a control frame to the communication apparatus 140 to release blocking (see reference numeral 141 in FIG. 1) performed by the communication apparatus 140.

As a result, the relay path for signals is switched from the path 105 to the path 201. In this example, the communication apparatus 120 also detects the failure in the line 101B. Therefore, as indicated by reference numeral 121, the communication apparatus 120 also blocks signals transmitted between the user apparatus 111 and the user apparatus 131 in the path including the communication apparatus 120.

Figure 3:
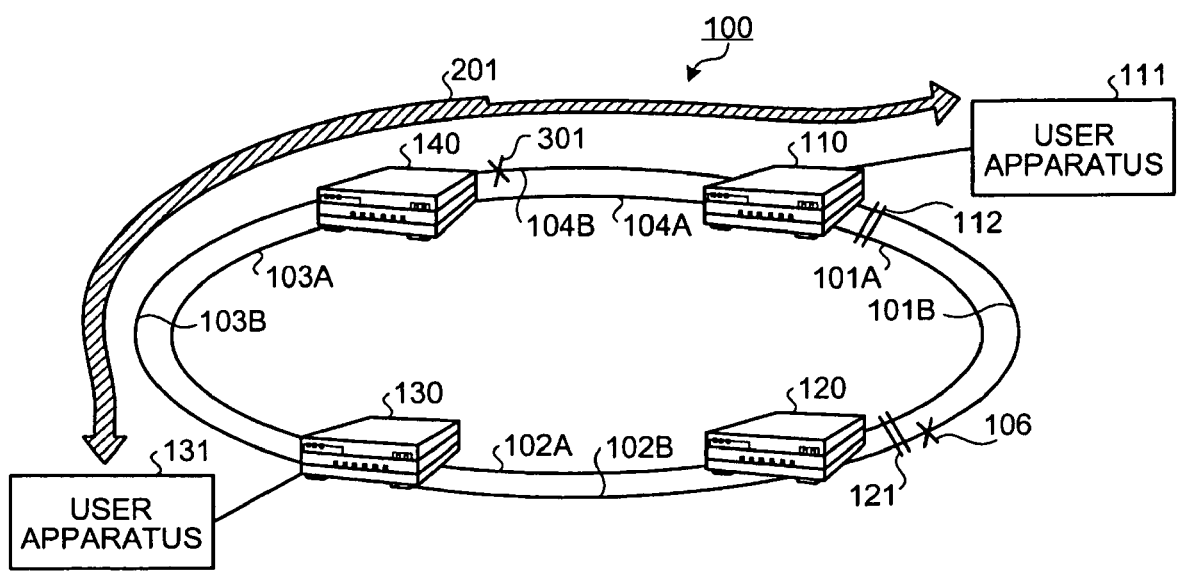

FIG. 3 is yet another schematic overview of communication apparatuses according to a first embodiment. After the relay path is switched to the path 201, the communication apparatus 110 detects failure occurring in any of the lines (the line 101A, the line 101B, the line 104A, and the line 104B). It is assumed that failure occurs in the line 104B as indicated by reference numeral 301. Thus, the communication apparatus 110 detects the failure in the line 104B.

For example, when among control frames transmitted and received between the communication apparatus 110 and the communication apparatus 140 through the line 104A and the line 104B, a control frame transmitted and received through the line 104B cannot be transmitted and/or received, the communication apparatus 110 detects failure in the line 104B. Upon detecting the failure in the line 104B, the communication apparatus 110 resets the relay path using, among the line 104A and the line 104B, the line having no failure detected therein.

The line having no failure detected therein is the line 104A according to this example. Therefore, the communication apparatus 110 resets the relay path with the communication apparatus 140 using the line 104A. Thus, as indicated by the width of the arrow representing the path 201, band becomes narrower between the communication apparatus 110 and the communication apparatus 140 since the line 104A alone is used; however, communication between the user apparatus 111 and the user apparatus 131 can be prevented from being completely disrupted.

No failure occurs in the line 103A and the line 103B. Therefore, the communication apparatus 140 uses both the line 103A and the line 103B between the communication apparatus 140 and the communication apparatus 130 to transmit signals. For example, when failure occurs in the line 103A, the communication apparatus 140 or the communication apparatus 130 detects the failure, and the relay path between the communication apparatus 140 and the communication apparatus 130 is reset using the line 103B.

Figure 4:
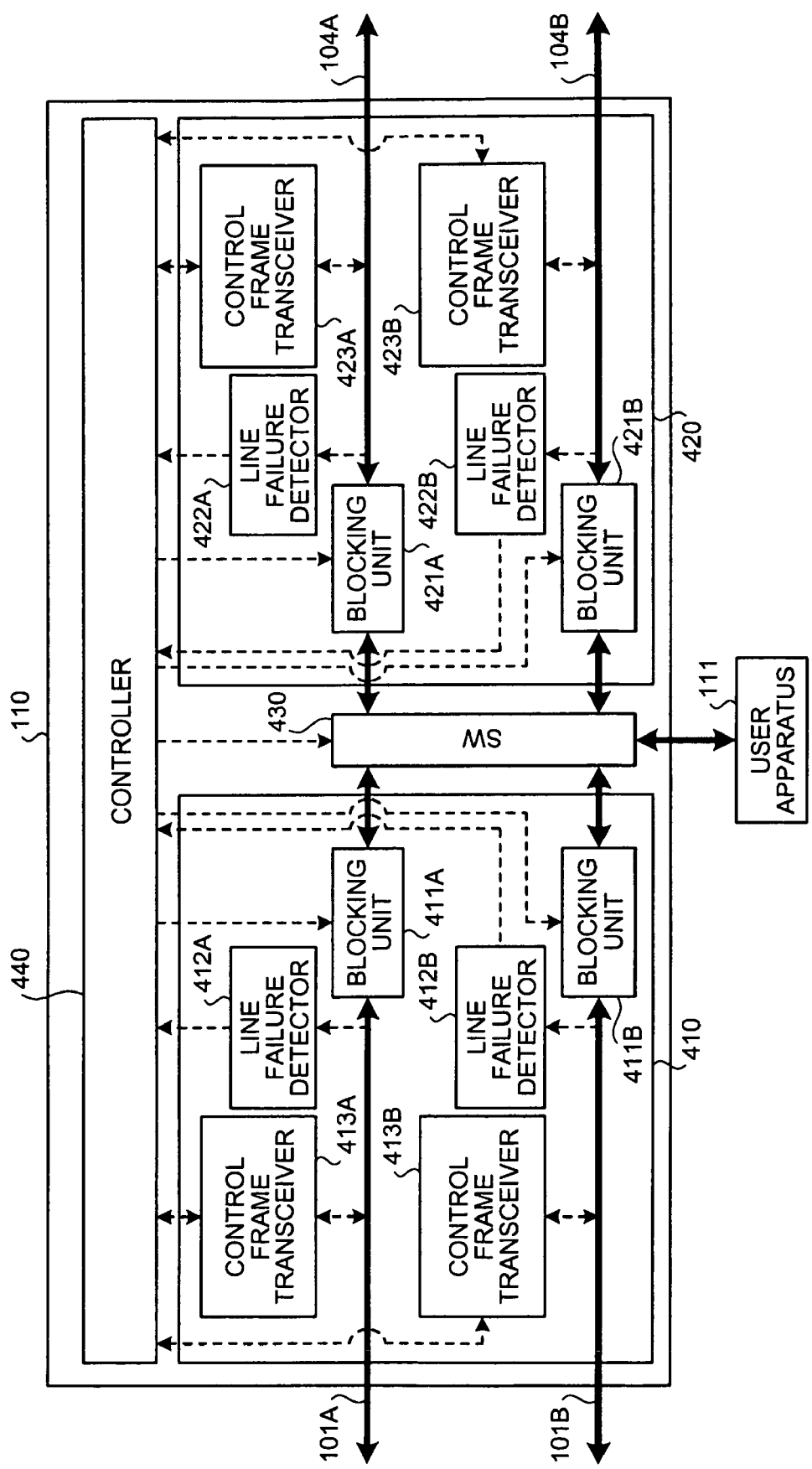
FIG. 4 is a block diagram of a configuration of each communication apparatus depicted in FIGS. 1 to 3.

FIG. 4 is a block diagram of a configuration of each communication apparatus depicted in FIGS. 1 to 3. Although the structure of the communication apparatus 110 will be explained, the communication apparatus 120, the communication apparatus 130, and the communication apparatus 140 have an identical configuration. The communication apparatus 110 has a first ring port 410, a second ring port 420, a switch 430, and a controller 440.

The first ring port 410 performs communication with the communication apparatus 120 via the line 101A and the line 101B. Specifically, the first ring port 410 includes a blocking unit 411A, a blocking unit 411B, a line failure detector 412A, a line failure detector 412B, a control frame transceiver 413A, and a control frame transceiver 413B.

The blocking unit 411A is connected with the communication apparatus 120 through the line 101A. Under the control of the controller 440, the blocking unit 411A sets and releases blocking. In a released state, the blocking unit 411A allows signals transmitted from the communication apparatus 120 via the line 101A to pass through to the switch 430.

In the released state, the blocking unit 411A also transmits a signal output from the switch 430 to the communication apparatus 120 through the line 101A. In a set state, the blocking unit 411A blocks signals transmitted from the communication apparatus 120 via the line 101A and blocks signals output from the switch 430.

The blocking unit 411B is connected with the communication apparatus 120 through the line 101B. Under the control of the controller 440, the blocking unit 411B sets and releases blocking. In a released state, the blocking unit 411B allows signals transmitted from the communication apparatus 120 via the line 101B to pass through to the switch 430.

In the released state, the blocking unit 411B also transmits a signal output from the switch 430 to the communication apparatus 120 through the line 101B. In a set state, the blocking unit 411B blocks signals transmitted from the communication apparatus 120 via the line 101B and blocks signals output from the switch 430.

The line failure detector 412A monitors signals transmitted and received between the blocking unit 411A and the communication apparatus 120 to detect failure in the line 101A. For example, the line failure detector 412A detects failure in the line 101A when a control frame regularly transmitted from the communication apparatus 120 through the line 101A cannot be received. Upon detecting the failure in the line 101A, the line failure detector 412A outputs failure detection notification to the controller 440.

The line failure detector 412B monitors signals transmitted and received between the blocking unit 411B and the communication apparatus 120 to detect failure in the line 101B. For example, the line failure detector 412B detects failure in the line 101B when a control frame regularly transmitted from the communication apparatus 120 through the line 101B cannot be received. Upon detecting the failure in the line 101B, the line failure detector 412B outputs failure detection notification to the controller 440.

The control frame transceiver 413A transmits to the communication apparatus 120 through the line 101A, a control frame that is output from the controller 440. The control frame transceiver 413A receives a control frame transmitted from the communication apparatus 120 via the line 101A and outputs the received control frame to the controller 440.

The control frame transceiver 413B transmits to the communication apparatus 120 through the line 101B, a control frame that is output from the controller 440. The control frame transceiver 413B receives a control frame transmitted from the communication apparatus 120 via the line 101B and outputs the received control frame to the controller 440.

The second ring port 420 performs communication with the communication apparatus 140 via the line 104A and the line 104B. Specifically, the second ring port 420 includes a blocking unit 421A, a blocking unit 421B, a line failure detector 422A, a line failure detector 422B, a control frame transceiver 423A, and a control frame transceiver 423B.

The blocking unit 421A is connected with the communication apparatus 140 through the line 104A. Under the control of the controller 440, the blocking unit 421A sets and releases blocking. In a released state, the blocking unit 421A allows signals transmitted from the communication apparatus 140 via the line 104A to pass through to the switch 430.

In the released state, the blocking unit 421A also transmits a signal output from the switch 430 to the communication apparatus 140 through the line 104A. In a set state, the blocking unit 421A blocks signals transmitted from the communication apparatus 140 via the line 104A and blocks signals output from the switch 430.

The blocking unit 421B is connected with the communication apparatus 140 through the line 104B. Under the control of the controller 440, the blocking unit 421B sets and releases blocking. In a released state, the blocking unit 421B allows signals transmitted from the communication apparatus 140 via the line 104B to pass through to the switch 430.

In the released state, the blocking unit 421B also transmits a signal output from the switch 430 to the communication apparatus 140 through the line 104B. In a set state, the blocking unit 421B blocks signals transmitted from the communication apparatus 140 via the line 104B and blocks signals output from the switch 430.

The line failure detector 422A monitors signals transmitted and received between the blocking unit 421A and the communication apparatus 140 to detect failure in the line 104A. For example, the line failure detector 422A detects failure in the line 104A when a control frame regularly transmitted from the communication apparatus 140 through the line 104A cannot be received. Upon detecting the failure in the line 104A, the line failure detector 422A outputs failure detection notification to the controller 440.

The line failure detector 422B monitors signals transmitted and received between the blocking unit 421B and the communication apparatus 140 to detect failure in the line 104B. For example, the line failure detector 422B detects failure in the line 104B when a control frame regularly transmitted from the communication apparatus 140 through the line 104B cannot be received. Upon detecting the failure in the line 104B, the line failure detector 422B outputs failure detection notification to the controller 440.

The control frame transceiver 423A transmits to the communication apparatus 140 through the line 104A, a control frame that is output from the controller 440. The control frame transceiver 423A receives a control frame transmitted from the communication apparatus 140 via the line 104A and outputs the received control frame to the controller 440.

The control frame transceiver 423B transmits to the communication apparatus 140 through the line 104B, a control frame that is output from the controller 440. The control frame transceiver 423B receives a control frame transmitted from the communication apparatus 140 via the line 104B and outputs the received control frame to the controller 440.

The switch 430 is a path changeover switch that under the control of the controller 440, changes over a signal path. Specifically, the switch 430 selectively outputs a signal output from the blocking unit 411A or the blocking unit 411B to any one of the blocking unit 421A, the blocking unit 421B, and the user apparatus 111.

The switch 430 likewise selectively outputs a signal output from the blocking unit 421A or the blocking unit 421B to any one of the blocking unit 411A, the blocking unit 411B, and the user apparatus 111. The switch 430 outputs a signal output from the user apparatus 111 to both sides, i.e., to the blocking unit 411A or the blocking unit 411B and, to the blocking unit 421A or the blocking unit 421B.

The controller 440 governs overall control of the communication apparatus 110. By the transmission and reception of control frames with the other communication apparatuses through the control frame transceiver 413A, the control frame transceiver 413B, the control frame transceiver 423A, and the control frame transceiver 423B, the controller 440 transmits and receives information concerning failures in the network 100, the switching of the relay paths, etc. The control frames transmitted and received by the controller 440 include, for example, a failure-notification frame, a block-setting frame, and a recovery detecting frame, which will be explained later.

The controller 440 also controls the setting or release of blocking executed by the blocking unit 411A, the blocking unit 411B, the blocking unit 421A, and the blocking unit 421B. The controller 440 controls the setting and release of blocking in the first ring port 410 and the second ring port 420.

For example, in regard to signals transmitted between the user apparatus 111 and the user apparatus 131, the controller 440 releases blocking in the blocking unit 411A and the blocking unit 411B, and sets blocking in the blocking unit 421A and the blocking unit 421B. Consequently, the path including the communication apparatus 120 can be released, and the path including the communication apparatus 140 can be blocked.

Further, in regard to signals transmitted between the user apparatus 111 and the user apparatus 131, the controller 440 sets blocking in the blocking unit 411A and the blocking unit 411B, and releases blocking in the blocking unit 421A and the blocking unit 421B. Consequently, the path including the communication apparatus 120 can be blocked, and the path including the communication apparatus 140 can be released.

The controller 440 controls the switch 430 to logically switch link aggregation. Logical switching of the link aggregation is switching between the line 101A and the line 101B utilized to output each signal that is to be transmitted to the communication apparatus 120. Logical switching of the link aggregation is switching between the line 104A and the line 104B utilized to output each signal that is to be transmitted to the communication apparatus 140.

For example, when neither the line failure detector 422A nor the line failure detector 422B outputs failure detection notification, the controller 400 determines that no failure has occurred in the line 104A or the line 104B. Hence, the controller 440 controls the switch 430 so as to evenly allocate signals with respect to the blocking unit 421A and the blocking unit 421B and output the signals, the signals being those output to the switch 430 from the blocking unit 411A, the blocking unit 411B, or the user apparatus 111.

Alternatively, when the line failure detector 422A outputs failure detection notification but the line failure detector 422B does not output failure detection notification, the controller 440 determines that failure has occurred in the line 104A alone. Hence, the controller 440 controls the switch 430 so as to output, to the blocking unit 421B, the signals output to the switch 430 from the blocking unit 411A, the blocking unit 411B, or the user apparatus 111.

When the line failure detector 422A does not output failure detection notification but the line failure detector 422B does, the controller 440 determines that failure has occurred in the line 104B alone. Hence, the controller 440 controls the switch 430 so as to output, to the blocking unit 421A, the signals output to the switch 430 from the blocking unit 411A, the blocking unit 411B, or the user apparatus 111.

Likewise, when neither the line failure detector 412A nor the line failure detector 412B outputs failure detection notification, the controller 440 determines that no failure has occurred in the line 101A or the line 101B. In this case, the controller 440 controls the switch 430 so as to evenly allocate signals with respect to the blocking unit 411A and the blocking unit 411B and output the signals, the signals being those output to the switch 430 from the blocking unit 421A, the blocking unit 421B, or the user apparatus 111.

Alternatively, when the line failure detector 412A outputs failure detection notification but the line failure detector 412B does not output failure detection notification, the controller 440 determines that failure has occurred in the line 101A alone. Hence, the controller 440 controls the switch 430 so as to output, to the blocking unit 411B, the signals output to the switch 430 from the blocking unit 421A, the blocking unit 421B, or the user apparatus 111.

When the line failure detector 412A does not output failure detection notification but the line failure detector 412B does, the controller 440 determines that failure has occurred in the line 101B alone. Hence, the controller 440 controls the switch 430 so as to output, to the blocking unit 411A, the signals output to the switch 430 from the blocking unit 421A, the blocking unit 421B, or the user apparatus 111.

The controller 440 controls the switch 430 to output to the user apparatus 111, a signal that is among the signals output to the switch 430 from the blocking unit 411A, the blocking unit 411B, the blocking unit 421A, and the blocking unit 421B and whose destination is the user apparatus 111 (Drop). The controller 440 controls the switch 430 to output to both the sides, i.e., to the blocking unit 411A or the blocking unit 411B and, to the blocking unit 421A or the blocking unit 421B, signals output to the switch 430 from the user apparatus 111 (Add).

When the line failure detector 412A, the line failure detector 412B, the line failure detector 422A, or the line failure detector 422B outputs failure detection notification, the controller 440 executes remedying operations for the failure. As to the remedying operations for failure, the controller 440 switches between two modes, i.e., a mode 1 and a mode 2 to perform operations.

When the controller 440 operates in the mode 1, the line failure detector 412A, the line failure detector 412B, the line failure detector 422A, the line failure detector 422B, and the controller 440 operate as a first detecting unit that detects failure in any one or more of the lines included in the path 105 set as the relay path between the communication apparatus 110 and the communication apparatus 130.

Here, when the first detecting unit detects failure, the blocking unit 411A, the blocking unit 411B, the blocking unit 421A, the blocking unit 421B, and the controller 440 operate as switching unit that switches the relay path to a path in an opposite direction in the network 100, i.e., the path 201 including the communication apparatus 140, as a remedying operation.

When the controller 440 operates in the mode 2, the line failure detector 412A, the line failure detector 412B, the line failure detector 422A, the line failure detector 422B, and the controller 440 operate as a second detecting unit that detects failure occurring in any of the lines included in the path 201 set as the relay path between the communication apparatus 110 and the communication apparatus 130 as a remedying operation.

Here, when the second detecting unit detects failure, the switch 430 and the controller 440 operate as a resetting unit that resets the relay path by using lines that are among the lines included in the path 201 and where no failure has occurred. Resetting of the relay path is the above-explained logical setting of link aggregation.

The controller 440 operates in the mode 1 when no failure has occurred in the network 100. When failure occurs in the network 100 while the controller 440 is operating in the mode 1, the controller 440 performs the remedying operation in the mode 1 and changes the operation mode from the mode 1 to the mode 2. When failure occurs in the network 100 while the controller 440 is operating in the mode 2, the controller 440 performs the remedying operation in the mode 2 and maintains the operation mode as the mode 2.

Figure 5:
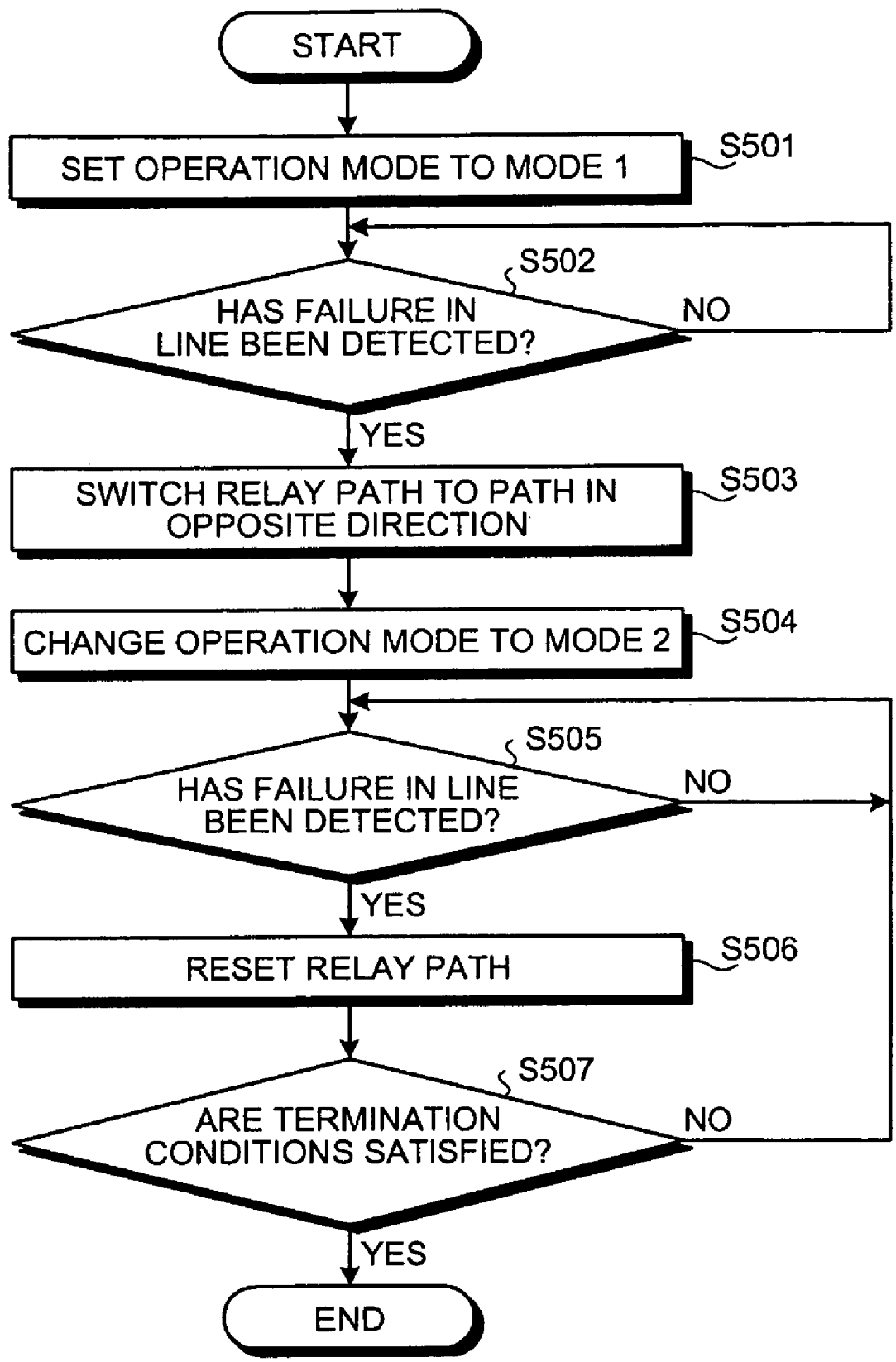
FIG. 5 is a flowchart of an example of an operation of the controller depicted in FIG. 4.

FIG. 5 is a flowchart of an example of an operation of the controller depicted in FIG. 4. In the example, it is assumed that the relay path for signals transmitted between the user apparatus 111 and the user apparatus 131 is set to the path 105 as depicted in FIG. 1. As depicted in FIG. 5, the controller 440 first sets the operation mode to the mode 1 as an initial setting (step S501). Then, whether failure has been detected in any one or more of the lines (the line 101A, the line 101B, the line 102A, and the line 102B) included in the relay path is judged (step S502).

Specifically, whether the line failure detector 412A and/or the line failure detector 412B have output failure detection notification is judged. Failure in the line 102A and/or the line 102B can be detected by receiving a failure-notification frame from the communication apparatus 120 or the communication apparatus 130 having detected the failure. When no failure is detected, waiting occurs until failure is detected (step S502: NO).

When failure is detected at step S502 (step S502: YES), the relay path is switched to the path 201 in the opposite direction (step S503). Specifically, blocking by the blocking unit 411A and the blocking unit 411B is set, and a control frame is transmitted to the communication apparatus 140 to release the blocking in the communication apparatus 140. In the example, it is assumed that failure in the line 101B is detected at step S502.

Next, the operation mode is changed from the mode 1 to the mode 2 (step S504). Subsequently, whether failure has been detected in any one or more of the lines (the line 103A, the line 103B, the line 104A, and the line 104B) included in the path 201 switched at step S503 is judged (step S505). Specifically, whether the line failure detector 422A or the line failure detector 422B has output failure detection notification is judged.

Failure in the line 103A and/or the line 103B can be detected by receiving a failure-notification frame from the communication apparatus 140 or the communication apparatus 130 having detected the failure. When no failure is detected at step S505, waiting occurs until failure is detected (step S505: NO).

When failure is detected (step S505: YES), the relay path is reset using lines that are among the lines (the line 103A, the line 103B, the line 104A, and the line 104B) included in the path 201 switched at step S503 and where no failure has occurred (step S506). In the example, it is assumed that failure in the line 104B is detected at step S505.

In this case, at step S506, the relay path is reset using the line 103A, the line 103B, and the line 104A. Then, whether termination conditions are satisfied is judged (step S507). When the termination conditions are not satisfied (step S507: NO), the flow returns to step S505 and the processing continues. When the termination conditions are satisfied (step S507: YES), the series of operations is terminated.

Figure 6:
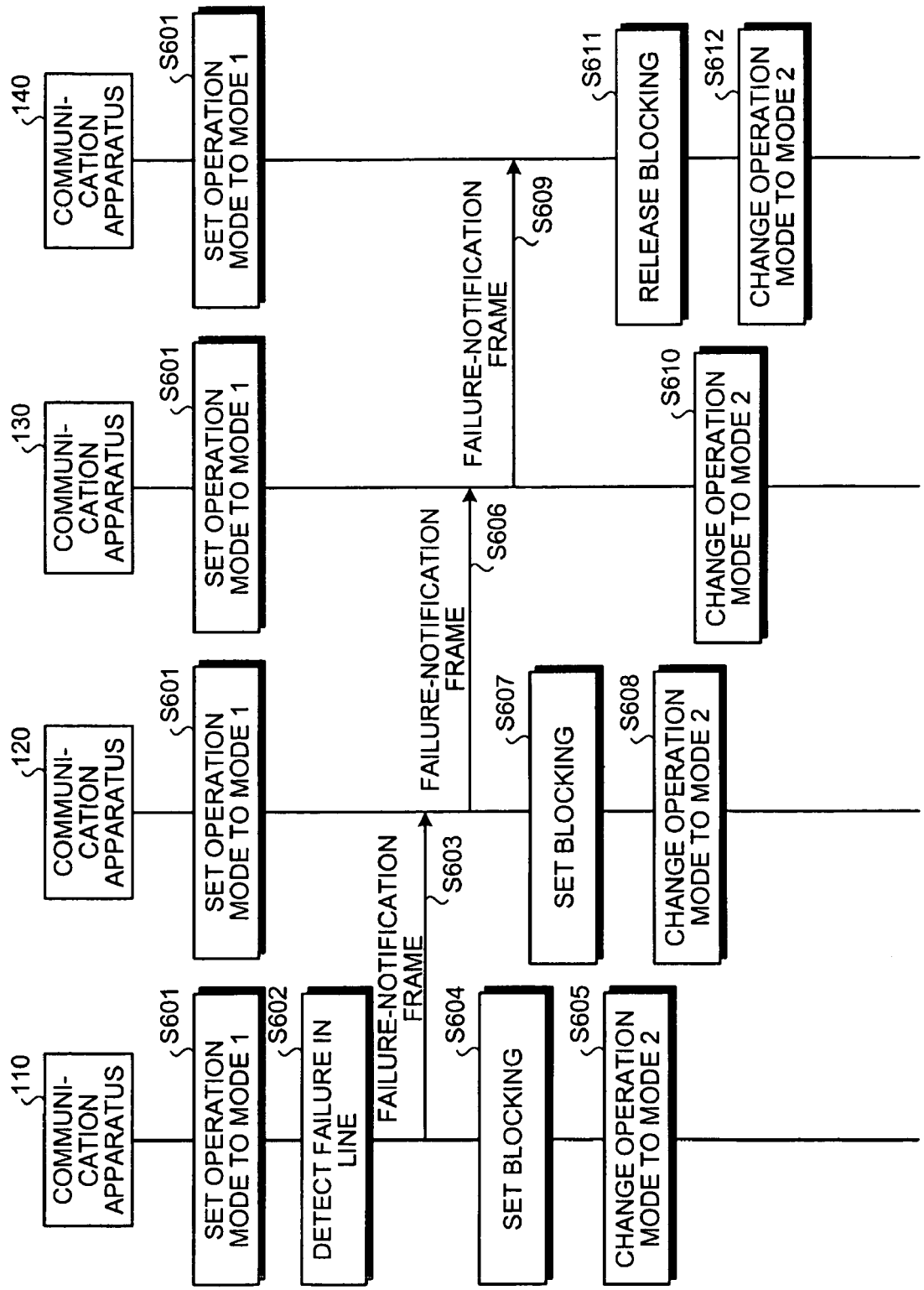
FIG. 6 is a sequence diagram of an example of operations of the communication apparatuses depicted in FIGS. 1 to 3.

FIG. 6 is a sequence diagram of an example of operations of the communication apparatuses depicted in FIGS. 1 to 3. As depicted in FIG. 1, in the example, it is assumed that the relay path for signals transmitted between the user apparatus 111 and the user apparatus 131 is set to the path 105. As depicted in FIG. 6, the communication apparatus 110, the communication apparatus 120, the communication apparatus 130, and the communication apparatus 140 each set the operation mode to the mode 1 as an initial state (step S601).

Next, it is assumed that the communication apparatus 110 detects failure in the line 101B included in the path 105 set as the relay path (step S602). Subsequently, the communication apparatus 110 transmits a failure-notification frame to the communication apparatus 120 (step S603). Then, the communication apparatus 110 sets blocking by the blocking unit 411A and the blocking unit 411B so as to block the path 105 where the failure has occurred (step S604).

Subsequently, the communication apparatus 110 changes the operation mode to the mode 2 (step S605). Then, the communication apparatus 120 transfers the failure-notification frame transmitted at step S603 to the communication apparatus 130 (step S606). Subsequently, the communication apparatus 120 sets blocking so as to block the path 105 where the failure has occurred (step S607). Then, the communication apparatus 120 changes the operation mode to the mode 2 (step S608).

Next, the communication apparatus 130 transfers the failure-notification frame transmitted at step S606 to the communication apparatus 140 (step S609). Subsequently, the communication apparatus 130 changes the operation mode to the mode 2 (step S610). Then, the communication apparatus 140 releases the blocking with respect to the path 201 including the communication apparatus 140 (step S611).

Next, the communication apparatus 140 changes the operation mode to the mode 2 (step S612), thereby terminating a series of operations of the communication apparatuses in the event of occurrence of a first failure. Thereafter, the communication apparatus 110, the communication apparatus 120, and the communication apparatus 130 perform the operations at steps S505 to S507 depicted in FIG. 5 to execute a remedying operation for a second failure.

As explained above, according to the communication apparatus 110, the communication apparatus 120, the communication apparatus 130, and the communication apparatus 140 of the first embodiment, the remedying scheme that changes over the relay path and the remedying scheme that uses a line where no failure is detected to reset the relay path can be switched according to a failure occurrence state.

Specifically, when failure occurs in any one of the lines at one position in the network 100, the relay path is changed to one in the opposite direction. As a result, communication between the user apparatus 111 and the user apparatus 131 can be maintained without reducing band. Therefore, when the first failure occurs, the efficiency of band utilization can be improved.

When another failure occurs in the network 100 with the relay path having been switched to one in the opposite direction, the relay path is reset by using lines where no failure has occurred. Consequently, communication between the user apparatus 111 and the user apparatus 131 can be prevented from being completely disrupted. Therefore, tolerance against multiple failures can be improved.

Figure 7:
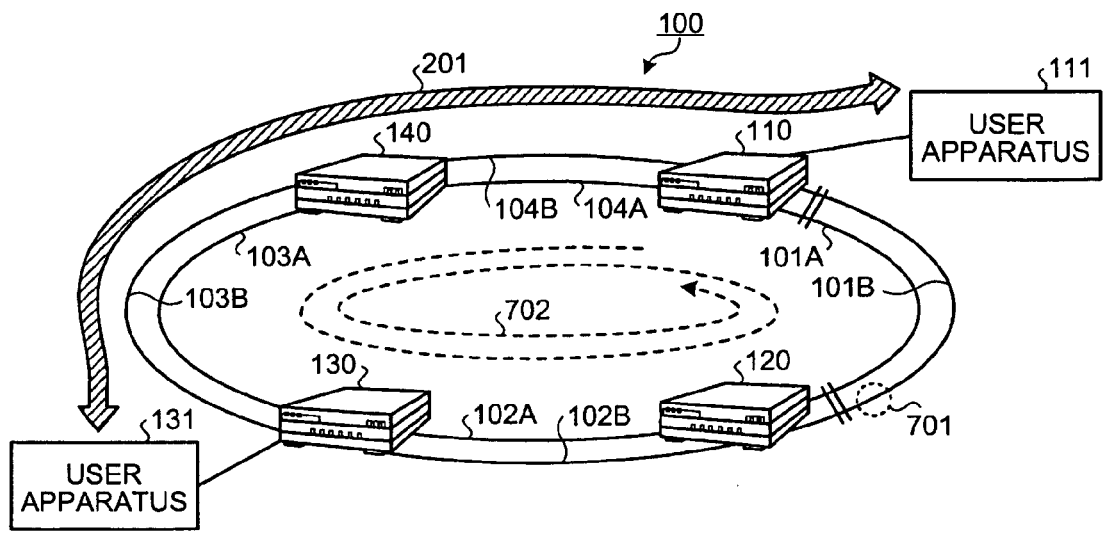
FIGS. 7 and 8 are schematic overviews of the communication apparatuses according to a second embodiment.

FIG. 7 is a schematic overview of the communication apparatuses according to a second embodiment. The communication apparatus 110, the communication apparatus 120, the communication apparatus 130, and the communication apparatus 140 according to the second embodiment perform operations when a line having a failure is remedied in addition to the remedying operations achieved by the communication apparatus 110, the communication apparatus 120, the communication apparatus 130, and the communication apparatus 140 according to the first embodiment.

FIG. 7 depicts a state where failure in the line 101B is remedied as indicated by reference numeral 701 in the state depicted in FIG. 2. At this time, the respective operation modes of the communication apparatus 110, the communication apparatus 120, the communication apparatus 130, and the communication apparatus 140 are kept as the mode 2. For example, a maintenance person or a maintenance apparatus of a network 100 inputs a block-setting command to the communication apparatus 110 after the line 101B is remedied.

The block-setting command is information concerning path switching of a repeating apparatus. Specifically, the block-setting command is information indicating that a need to switch the relay path from a path 201 to a path 105. Alternatively, the block-setting command is information for setting blocking in the communication apparatuses to switch the relay path from the path 201 to the path 105. For example, the block-setting command is information indicating that the communication apparatus 110 and the communication apparatus 120 should release blocking and the communication apparatus 140 should set blocking.

The communication apparatus 110 transmits to the communication apparatus 140, a block-setting frame based on the input block-setting command. The block-setting frame transmitted from the communication apparatus 110 to the communication apparatus 140 is sequentially transferred by the communication apparatus 140, the communication apparatus 130, and the communication apparatus 120 and makes a circuit to return to the communication apparatus 110. In this example, the communication apparatus 110 causes the block-setting frame to make two circuits as indicated by reference numeral 702.

Figure 8:
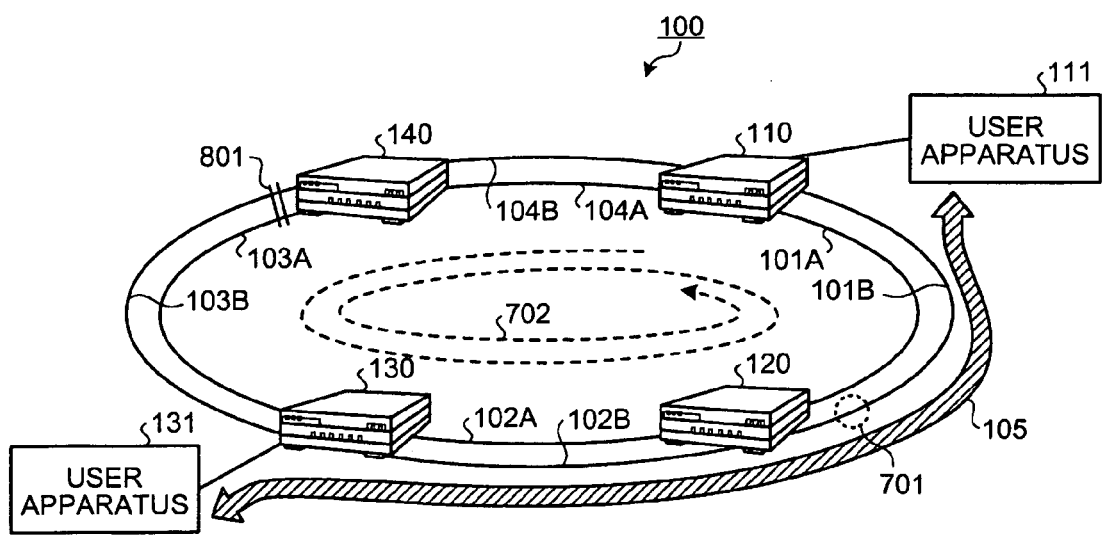

FIG. 8 is another schematic overview of the communication apparatuses according to the second embodiment. When the block-setting frame transmitted to the communication apparatus 140 completes a circuit to return to the communication apparatus 110, the communication apparatus 110 again transmits the block-setting frame after the second circuit to the communication apparatus 140 and releases blocking on the communication apparatus 120 side.

Upon receiving the block-setting frame after the second circuit, the block-setting frame being transmitted from the communication apparatus 110, the communication apparatus 140, the communication apparatus 130, and the communication apparatus 120 transfer the received block-setting frame and change the setting of the blocking based on the block-setting frame. In this example, the communication apparatus 140 sets blocking.

The communication apparatus 120 sets blocking on the communication apparatus 110 side. As a result, the relay path is switched from the path 201 to the path 105. Therefore, in the state depicted in FIG. 1, the state returns to that before the failure in the line 101B occurred. Then, the communication apparatus 110, the communication apparatus 120, the communication apparatus 130, and the communication apparatus 140 restore the operation mode to the mode 1 and again execute the remedying operation explained in the first embodiment.

That is, the communication apparatus 110 switches the relay path from the path 105 to the path 201 to change the operation mode to the mode 2, and then detects whichever occurs first among: failure in any of the lines included in the path 201, and recovery of the line 101B where the failure has been detected. When the communication apparatus 110 detects failure in any of the lines included in the path 201 first, the communication apparatus 110 performs the remedying operation based on the mode 2. When the communication apparatus 110 detects recovery of the line 101B first, the communication apparatus 110 restores the operation mode to the mode 1.

Figure 9:
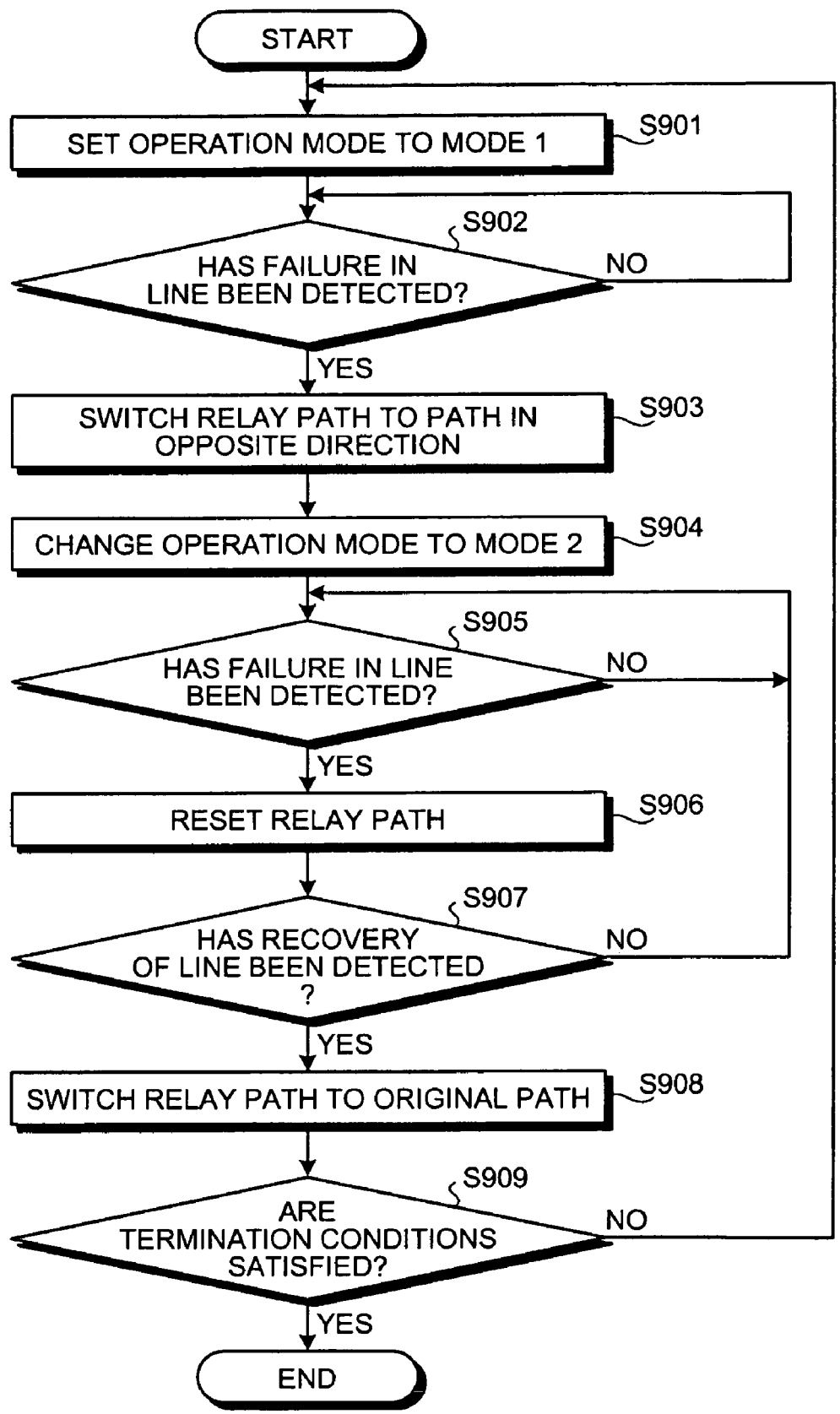
FIG. 9 is a flowchart of an example of an operation of the controller of the communication apparatus according to the second embodiment.

FIG. 9 is a flowchart of an example of an operation of the controller of the communication apparatus according to the second embodiment. An operation of the controller 440 in the communication apparatus 110 will be explained. Steps S901 to S906 depicted in FIG. 9 are identical to steps S501 to S506 depicted in FIG. 5 and explanation thereof is omitted.

After resetting the relay path using lines where no failure has occurred (step S906), the controller 440 judges whether recovery of a line where failure has occurred is detected (step S907). Specifically, the controller 440 judges whether the line where the failure occurred has recovered based on whether the control frame transceiver 413A or the control frame transceiver 413B receives a block-setting frame of a first circuit.

When recovery of the line where the failure has occurred is not detected at step S907, waiting occurs until recovery of the line is detected (step S907: NO). When recovery of the line where the failure has occurred is detected (step S907: YES), the relay path switched at step S903 is changed over to the original path (step S908).

Specifically, the relay path is changed over to the path 105 from the path 201. Then, whether termination conditions are satisfied is judged (step S909). When the termination conditions are not satisfied (step S909: NO), flow returns to step S901 and processing continues. When the termination conditions are satisfied (step S909: YES), the series of operations is terminated.

Figure 10:
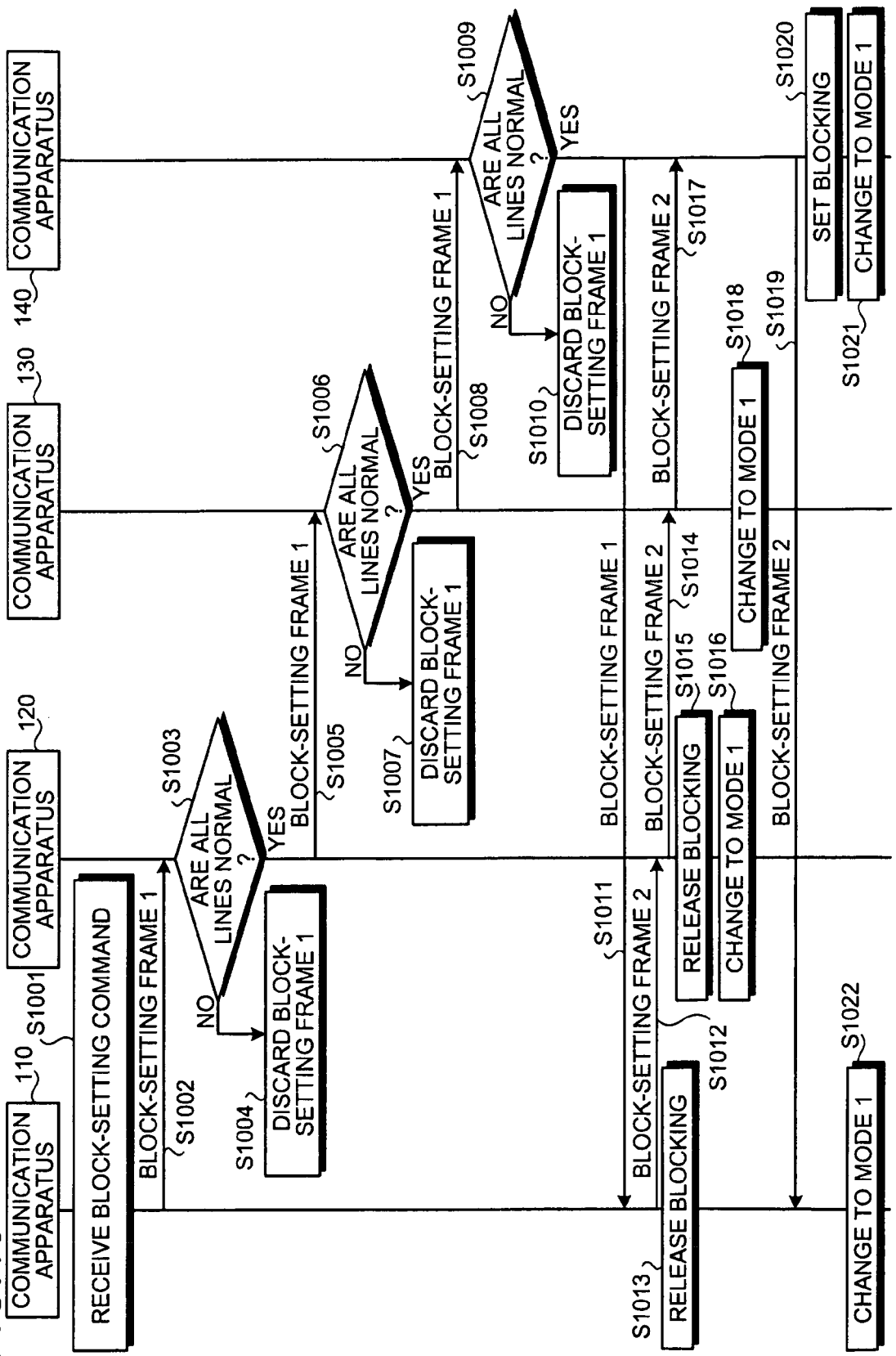
FIG. 10 is a sequence diagram of an example of operations of the communication apparatuses depicted in FIGS. 7 and 8.

FIG. 10 is a sequence diagram of an example of operations of the communication apparatuses depicted in FIGS. 7 and 8. In the example, it is assumed that the relay path is set to the path 201, the line 101B has recovered from a failure, and the respective operation modes of the communication apparatus 110, the communication apparatus 120, the communication apparatus 130, and the communication apparatus 140 are still kept as the mode 2 as depicted in FIG. 7.

The communication apparatus 110 receives a block-setting command input from a maintenance person or a maintenance apparatus (step S1001). Then, the communication apparatus 110 transmits to the communication apparatus 120, a block-setting frame 1 based on the block-setting command received at step S1001 (step S1002).

Subsequently, to judge whether all the lines connected with the communication apparatus 120 are normal, the communication apparatus 120 monitors control frames that the communication apparatus 120 transmits to and receives from the communication apparatus 110 as well as those transmitted to and received from the communication apparatus 130, both the communication apparatus 110 and the communication apparatus 130 being adjacent to the communication apparatus 120 (step S1003). At step S1003, the lines include the line 101A, the line 101B, the line 102A, and the line 102B.

When all the lines are not normal at step S1003 (step S1003: NO), i.e., when failure occurs in any one or more of the lines, the block-setting frame 1 transmitted at step S1002 is discarded (step S1004) to terminate a series of operations performed by the communication apparatuses. When all the lines are normal (step S1003: YES), the block-setting frame 1 transmitted at step S1002 is transferred to the communication apparatus 130 (step S1005).

Then, to judge whether all the lines connected with the communication apparatus 130 are normal, the communication apparatus 130 monitors control frames that the communication apparatus 130 transmits to and received from the communication apparatus 120 as well as those transmitted to and received from the communication 140, both the communication apparatus 120 and the communication apparatus 140 being adjacent to the communication apparatus 130 (step S1006). At step S1006, the lines include the line 102A, the line 102B, the line 103A, and the line 103B.

When all the lines are not normal at step S1006 (step S1006: NO), the block-setting frame 1 transmitted at step S1005 is discarded (step S1007), and the series of operations performed by the respective communication apparatuses is terminated. When all the lines are normal (step S1006, YES), the block-setting frame 1 transmitted at step S1005 is transferred to the communication apparatus 140 (step S1008).

Subsequently, to judge whether all the lines connected with the communication apparatus 140 are normal, the communication apparatus 140 monitors control frames that the communication apparatus 140 transmits to and receives from the communication apparatus 130 as well as those transmitted to and received from the communication apparatus 110, both the communication apparatus 130 and the communication apparatus 110 being adjacent to the communication apparatus 140 (step S1009). At step S1009, the lines include the line 103A, the line 103B, the line 104A, and the line 104B.

When all the lines are not normal at step S1009 (step S1009: NO), the block-setting frame 1 transmitted at step S1008 is discarded (step S1010), and the series of operations performed by the respective communication apparatuses is terminated. When all the lines are normal (step S1009: YES), the block-setting frame 1 transmitted at step S1008 is transferred to the communication apparatus 110 (step S1011).

Then, the communication apparatus 110 transmits a block-setting frame 2 as a block-setting frame of a second circuit to the communication apparatus 120 (step S1012). Subsequently, the communication apparatus 110 releases blocking so as to release a path including the communication apparatus 120 (step 1013). Then, the communication apparatus 120 transfers the block-setting frame 2 transmitted at step S1012 to the communication apparatus 130 (step S1014).

Then, the communication apparatus 120 releases blocking so as to release a path including the communication apparatus 120 (step S1015). Subsequently, the communication apparatus 120 changes the operation mode thereof from the mode 2 to the mode 1 (step S1016). Then, the communication apparatus 130 transfers the block-setting frame 2 transmitted at step S1014 to the communication apparatus 140 (step S1017).

Subsequently, the communication apparatus 130 changes the operation mode thereof from the mode 2 to the mode 1 (step S1018). The communication apparatus 130 does not control setting or the release of blocking. The communication apparatus 140 transfers the block-setting frame 2 transmitted at step S1017 to the communication apparatus 110 (step S1019).

Next, the communication apparatus 140 sets blocking so as to block a path including the communication apparatus 140 (step S1020). Subsequently, the communication apparatus 140 changes the operation mode thereof from the mode 2 to the mode 1 (step S1021). Then, the communication apparatus 110 changes the operation mode thereof from the mode 2 to the mode 1 (step S1022), thereby terminating a series of operations.

When failure occurs in any one or more of the lines (the line 101A, the line 102A, the line 102B, the line 103A, the line 103B, the line 104A, and the line 104B), even though the line 101B has recovered from the failure, the processing is terminated at step S1004, step S1007, or step S1010. Therefore, the relay path is maintained as the path 201, the respective operation modes of the communication apparatus 110, the communication apparatus 120, the communication apparatus 130, and the communication apparatus 140 are maintained as the mode 2.

When the line 101B has recovered from the failure and the occurrence of failure is not observed in any of the lines (the line 101A, the line 102A, the line 102B, the line 103A, the line 103B, the line 104A, and the line 104B), the processing from the current step to step 1020 is executed. Therefore, the relay path is switched to the path 105, and the respective operation modes of the communication apparatus 110, the communication apparatus 120, the communication apparatus 130, and the communication apparatus 140 are restored to the mode 1.

Figure 11:
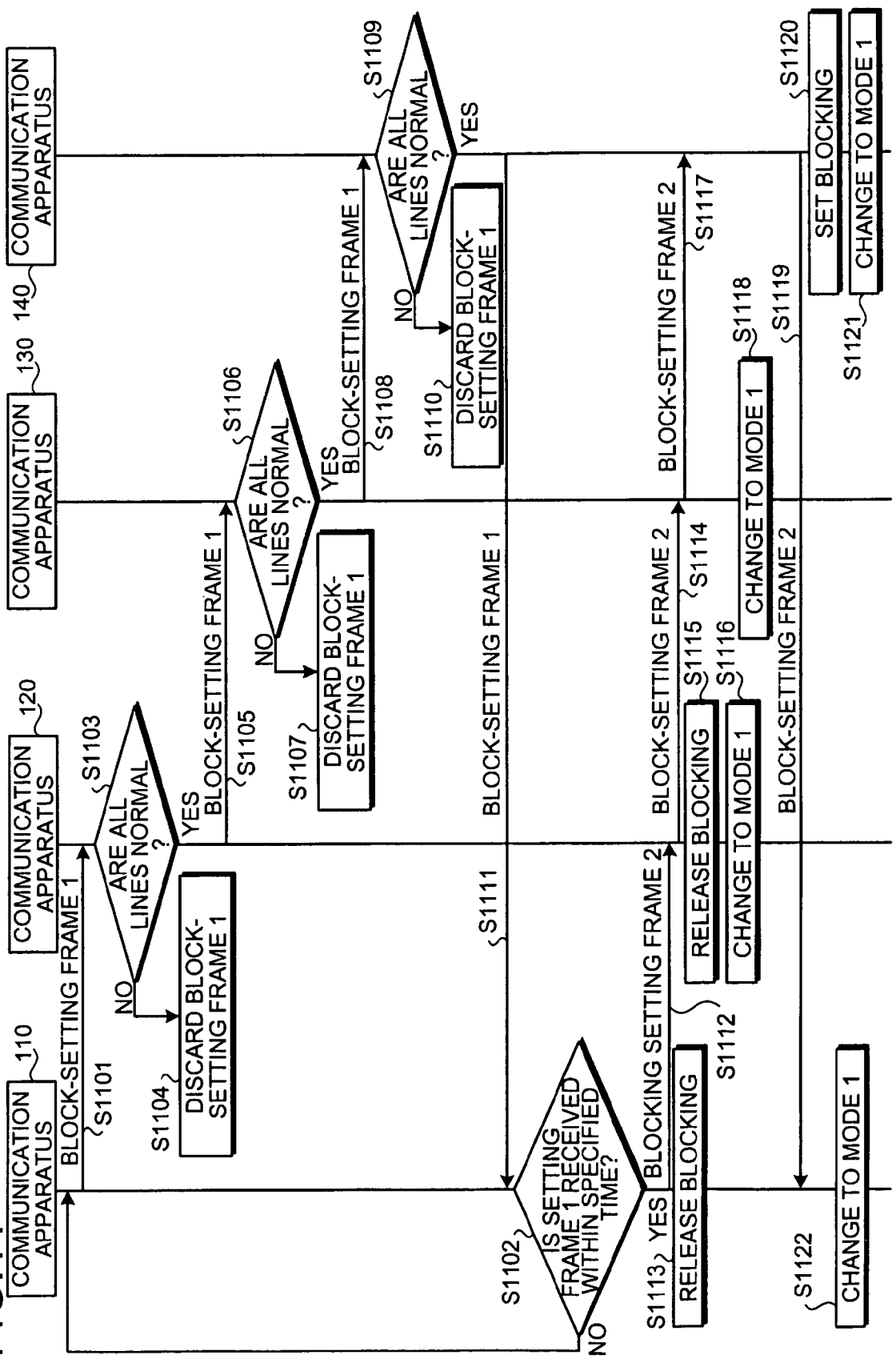
FIG. 11 is a sequence diagram of another example of operations by the communication apparatuses depicted in FIGS. 7 and 8.

FIG. 11 is a sequence diagram of another example of operations by the communication apparatuses depicted in FIGS. 7 and 8. Similar to FIG. 10, it is assumed that the relay path is set to the path 201, the line 101B has recovered from failure, and the respective operation modes of the communication apparatus 110, the communication apparatus 120, the communication apparatus 130, and the communication apparatus 140 are maintained as the mode 2.

The communication apparatus 110 transmits the block-setting frame 1 to the communication apparatus 120 (step S1101). Then, the control advances to step S1103, and the communication apparatus 110 waits for a specified time after transmission of the block-setting frame 1 at step S1101 and judges whether the setting frame 1 having made a circuit passing through the communication apparatus 140, the communication apparatus 130, and the communication apparatus 120 is received within the specified time (step S1102).

When the setting frame 1 is not received within the specified time at step S1102 (step S1102: NO), the control returns to step S1101 to continue the processing. That is, the communication apparatus 110 keeps transmitting the setting frame 1 until the setting frame 1 having made a circuit is received within the specified time. When the setting frame 1 is received within the specified time (step S1102: YES), the control advances to step S1113 and processing continues.

Steps S1103 to S1111 are identical to steps S1003 to S1011 depicted in FIG. 10, thereby omitting an explanation thereof. Steps S1112 to S1122 are identical to steps S1012 to S1022 depicted in FIG. 10, thereby omitting an explanation thereof.

According to each step depicted in FIG. 11, when failure occurs in any one or more of the lines, (the line 101A, the line 102A, the line 102B, the line 103A, the line 103B, the line 104A, and the line 104B), the communication apparatus 110 keeps transmitting the setting frame 1.

When a line among the line 101A, the line 102A, the line 102B, the line 103A, the line 103B, the line 104A, and the line 104B and having a failure has recovered, the relay path is automatically switched to the path 105, and the respective operation modes of the communication apparatus 110, the communication apparatus 120, the communication apparatus 130, and the communication apparatus 140 can be restored to the mode 1.

As explained above, the communication apparatus 110, the communication apparatus 120, the communication apparatus 130, and the communication apparatus 140 according to the second embodiment can achieve the effects of the communication apparatus 110, the communication apparatus 120, the communication apparatus 130, and the communication apparatus 140 according to the first embodiment and restore the operation modes to the mode 1 when a line is recovered from a failure.

Therefore, when failure occurs in any one of the lines at one position in the network 100 after a line has recovered, the remedying operation of switching the relay path to one in the opposite direction can be executed. As a result, communication between the user apparatus 111 and the user apparatus 131 can be maintained without a reduction in band. Therefore, the efficiency of band utilization at the time of occurrence of a first failure can be improved.

Figure 12:
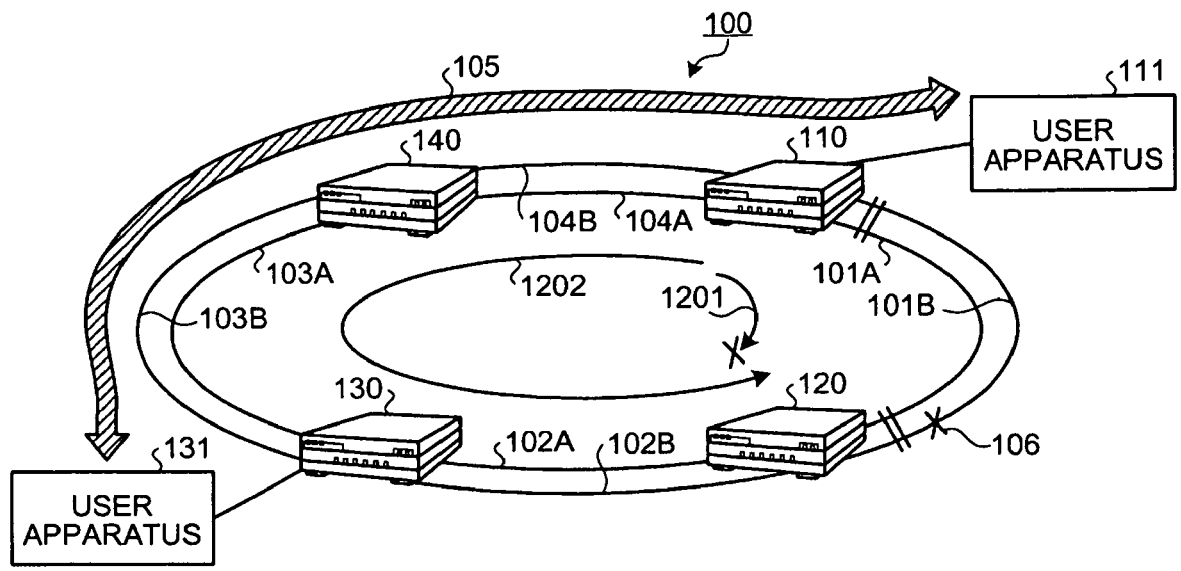
FIGS. 12 and 13 are schematic overviews of the communication apparatuses according to a third embodiment.

FIG. 12 is a schematic overview of the communication apparatuses according to a third embodiment. The communication apparatus 110, the communication apparatus 120, the communication apparatus 130, and the communication apparatus 140 according to the third embodiment perform operations when a line is recovered from a failure in addition to the remedying operations achieved by the communication apparatus 110, the communication apparatus 120, the communication apparatus 130, and the communication apparatus 140 according to the first embodiment. As depicted in FIG. 12, the communication apparatus 110 changes the operation mode of the controller 440 to the mode 2, and then periodically transmits a recovery detecting frame to the communication apparatus 120 and the communication apparatus 140.

Reference numeral 1201 represents a flow of the recovery detecting frame transmitted from the communication apparatus 110 to the communication apparatus 120. Reference numeral 1202 represents a flow of the recovery detecting frame transmitted from the communication apparatus 110 to the communication apparatus 140. Upon receiving the recovery detecting frame, the communication apparatus 120, the communication apparatus 130, and the communication apparatus 140 each monitor states of all lines connected thereto and transfer the recovery detecting frame only when all the lines are normal.

Since, according to the example, failure occurs in a line 101B as represented by reference numeral 106, the respective recovery detecting frames denoted by the reference numerals 1201 and 1202 are discarded by the communication apparatus 120. Therefore, the respective recovery detecting frames are not returned to the communication apparatus 110. As a result, the communication apparatus 110 determines that the line 101B has not recovered from the failure.

Figure 13:
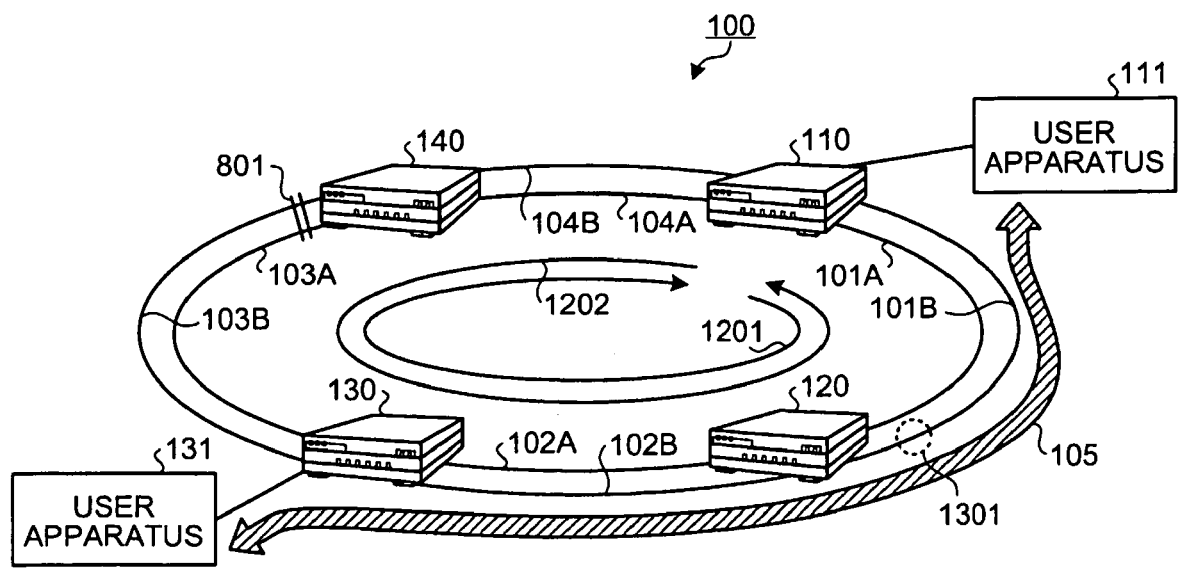

FIG. 13 is another schematic overview of the communication apparatuses according to the third embodiment. It is assumed that the line 101B is recovered from the failure as represented by reference numeral 1301. Hence, the respective recovery detecting frames denoted by the reference numerals 1201 and 1202 are transferred by the communication apparatus 120 without being discarded. Therefore, the respective recovery detecting frames are returned to the communication apparatus 110. As a result, the communication apparatus 110 determines that the line 101B has recovered from the failure.

When the communication apparatus 120, the communication apparatus 130, and the communication apparatus 140 each receives both the recovery detecting frames indicated by the reference numerals 1201 and 1202 and determines that all the lines connected thereto are normal, the communication apparatus 120, the communication apparatus 130, and the communication apparatus 140 each determines that the line 101B has recovered from the failure. When the communication apparatus 110, the communication apparatus 120, the communication apparatus 130, and the communication apparatus 140 determine that the line 101B has recovered from the failure, the relay path is switched to the path 105 that was used before switching.

Figure 14:
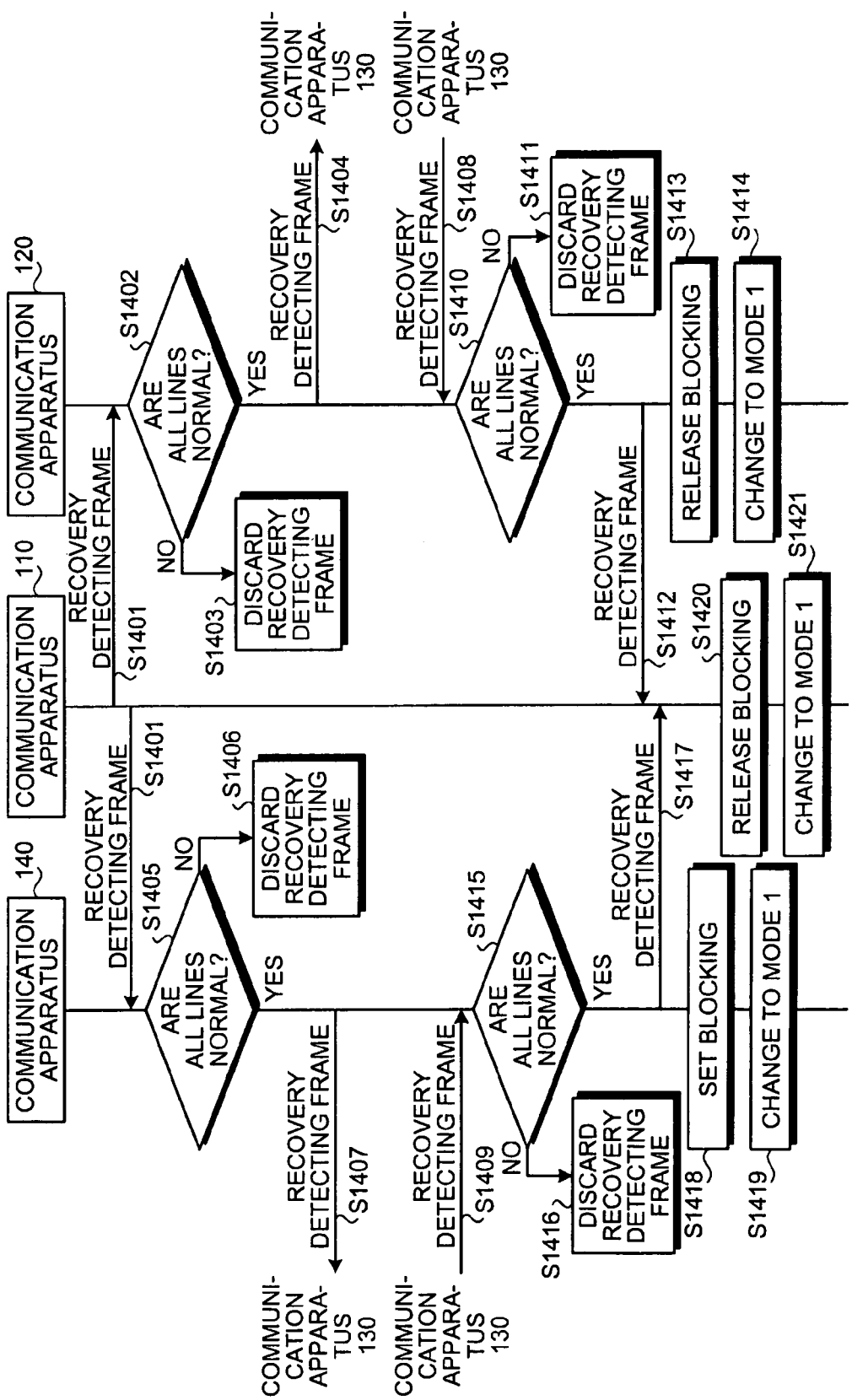
FIG. 14 is a sequence diagram of an example of operations by the respective communication apparatuses depicted in FIGS. 12 and 13.

FIG. 14 is a sequence diagram of an example of operations by the respective communication apparatuses depicted in FIGS. 12 and 13. In the example, it is assumed that the relay path is set to the path 201, the line 101B is recovered from the failure, and the respective operation modes of the communication apparatus 110, the communication apparatus 120, the communication apparatus 130, and the communication apparatus 140 are maintained as the mode 2 as depicted in FIG. 7.

In regard to the operation performed by the communication apparatus 130, the transmission and reception of control frames between the communication apparatus 120 and the communication apparatus 140 alone are depicted, and a detailed explanation thereof will be omitted. The communication apparatus 110, the communication apparatus 120, the communication apparatus 130, and the communication apparatus 140 repeatedly execute the following steps. The communication apparatus 110 first transmits a recovery detecting frame to the communication apparatus 120 and the communication apparatus 140 (step S1401).

Then, to judge whether all the lines connected with the communication apparatus 120 are normal, the communication apparatus 120 monitors control frames that the communication apparatus 120 transmits to and receives from the communication apparatus 110 and the communication apparatus 130, which are adjacent the communication apparatus 120 (step S1402). At step S1402, the lines include the line 101A, the line 101B, the line 102A, and the line 102B.

When all the lines are not normal at step S1402 (step S1402: NO), the recovery detecting frame transmitted at step S1401 is discarded (step S1403), and a series of operations performed by the respective communication apparatuses is terminated. When all the lines are normal (step S1402: YES), the recovery detecting frame transmitted at step S1401 is transferred to the communication apparatus 130 (step S1404).

Then, to judge whether all the lines connected with the communication apparatus 140 are normal, the communication apparatus 140 monitors control frames that the communication apparatus 140 transmits to and receives from the communication apparatus 130 and the communication apparatus 110, which are adjacent to the communication apparatus 140 (step S1405). At step s1405, the lines include the line 103A, the line 103B, the line 104A, and the line 104B.

When all the lines are not normal at step S1405 (step S1405: NO), the recovery detecting frame transmitted at step S1401 is discarded (step S1406), and a series of operations performed by the respective communication apparatuses is terminated. When all the lines are normal (step S1405: YES), the recovery detecting frame transmitted at step S1401 is transferred to the communication apparatus 130 (step S1407).

It is assumed that the communication apparatus 130 receives respective recovery detecting frames from the communication apparatus 120 and the communication apparatus 140 and determines that all the lines connected with the communication apparatus 130 are normal. Hence, the communication apparatus 130 transfers the recovery detecting frame to the communication apparatus 120 (step S1408). Then, the communication apparatus 130 transfers the recovery detecting frame to the communication apparatus 140 (step S1409).

Subsequently, to judge whether all the lines connected with the communication apparatus 120 are normal, the communication apparatus 120 monitors control frames that the communication apparatus 120 transmits to and receives from the communication apparatus 110 and the communication apparatus 130, which adjacent to the communication apparatus 120 (step S1410). At step S1410, the lines include the line 101A, the line 101B, the line 102A, and the line 102B.

When all the lines are not normal at step S1410 (step S1410: NO), the recovery detecting frame transmitted at step S1408 is discarded (step S1411), and a series of operations performed by the respective communication apparatuses is terminated. When all the lines are normal (step S1410: YES), the recovery detecting frame transmitted at step S1408 is transferred to the communication apparatus 110 (step S1412).

Then, the communication apparatus 120 releases blocking so as to release a path including the communication apparatus 120 (step S1413). Subsequently, the communication apparatus 120 changes the operation mode from the mode 2 to the mode 1 (step S1414).

Then, to judge whether all the lines connected with the communication apparatus 140 are normal, the communication apparatus 140 monitors control frames that the communication apparatus 140 transmits to and receives from the communication apparatus 130 and the communication apparatus 110, which are adjacent to the communication apparatus 140 (step S1415). At step S1415, the lines include the line 103A, the line 103B, the line 104A, and the line 104B.

When all the lines are not normal at step S1415 (step S1415: NO), the recovery detecting frame transmitted at step S1409 is discarded (step S1416), and a series of operations by the respective communication apparatuses is terminated. When all the lines are normal (step S1415: YES), the recovery detecting frame transmitted at step S1409 is transferred to the communication apparatus 110 (step S1417).

Subsequently, the communication apparatus 140 sets blocking so as to block a path including the communication apparatus 140 (step S1418). Then, the communication apparatus 140 changes the operation mode from the mode 2 to the mode 1 (step S1419). Next, the communication apparatus 110 releases blocking so as to release the path including the communication apparatus 120 (step S1420). Subsequently, the communication apparatus 110 changes the operation mode from the mode 2 to the mode 1 (step S1421), and a series of operations by the respective communication apparatuses when the line 101B is recovered from the failure is terminated.

When failure occurs in any one or more of the lines, (the line 101A, the line 101B, the line 102A, the line 102B, the line 103A, the line 103B, the line 104A, and the line 104B), the recovery detecting frame is discarded at step S1403, step S1406, step S1411, or step S1416, and the series of operations is terminated. Therefore, the relay path is maintained as the path 201, and the respective operation modes of the communication apparatus 110, the communication apparatus 120, the communication apparatus 130, and the communication apparatus 140 are also maintained as the mode 2.

When the line 101A, the line 101B, the line 102A, the line 102B, the line 103A, the line 103B, the line 104A, and the line 104B no longer have a failure, the processing from the current step to step S1421 is executed. Therefore, the relay path is switched to the path 105, and the respective operation modes of the communication apparatus 110, the communication apparatus 120, the communication apparatus 130, and the communication apparatus 140 are restored to the mode 1.

As explained above, the communication apparatus 110, the communication apparatus 120, the communication apparatus 130, and the communication apparatus 140 according to the third embodiment can achieve the effects of the communication apparatus 110, the communication apparatus 120, the communication apparatus 130, and the communication apparatus 140 according to the first embodiment, automatically detect recovery from a failure in a line, and restore the operation modes to the mode 1.

Therefore, when failure occurs in any one of the lines at one position in the network 100 after a line has recovered, the relay path is switched to one in the opposite direction. As a result, communication between the user apparatus 111 and the user apparatus 131 can be maintained without a reduction in band. Therefore, the efficiency of band utilization at the time of occurrence of a first failure can be improved.

As explained above, according to the embodiments, the efficiency of band utilization and tolerance against multiple failures can be improved.

A state where pairs of lines are provided between each of the communication apparatuses is explained in each of the foregoing embodiments; however, three or more lines may be provided in each section between the respective communication apparatuses. The number of lines provided between the communication apparatuses may differ depending on each section between the communication apparatuses.

Figure 15:
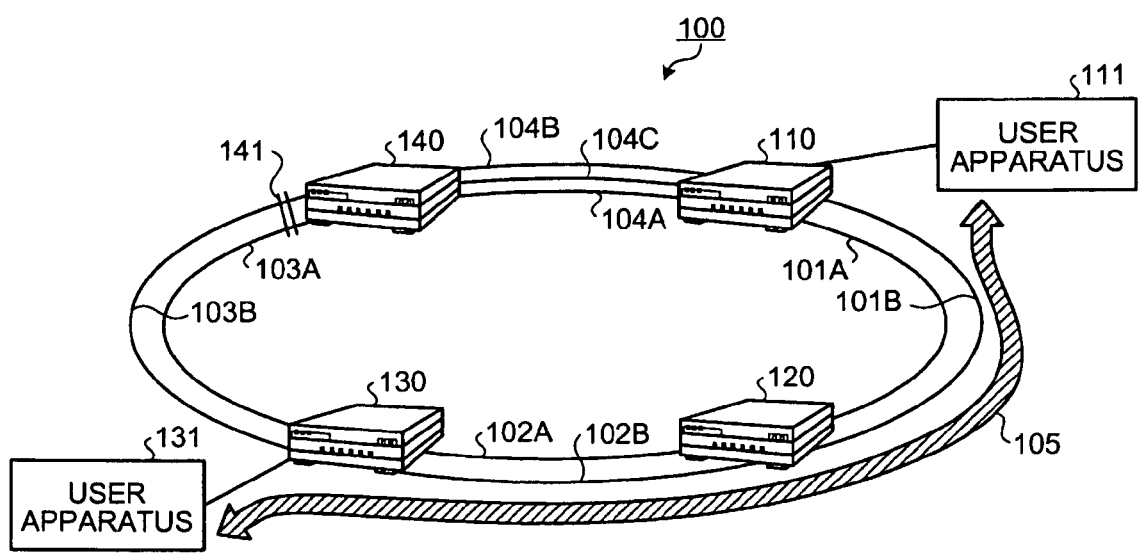
FIG. 15 is a block diagram of a modification of the network depicted in FIG. 1.

FIG. 15 is a block diagram of a modification of the network depicted in FIG. 1. As depicted in FIG. 15, in the network 100, the communication apparatus 110 is connected with the communication apparatus 140 through three lines, i.e., the line 104A, the line 104B, and a line 104C. In this case, a relay path is switched to a path 201 to change the operation mode to the mode 2, and then the communication apparatus 110 detects failure occurring in any of the lines, (the line 103A, the line 103B, the line 104A, the line 104B, and the line 104C) included in the path 201 after switching.

For example, it is assumed that failure occurs in the line 104B. When the communication apparatus 110 detects the failure in the line 104B, it resets the relay path by using the line 104A and the line 104C where no failure has been detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication apparatus on a network having ring topology and connecting a plurality of communication apparatuses such that adjacent communication apparatuses are connected through a plurality of lines, the communication apparatus comprising:
   a first detecting unit that detects failure occurring in a line that is among the lines and included in a relay path set between the communication apparatus and a communication apparatus on the network;
   a switching unit that, when the first detecting unit detects failure, switches the relay path to a relay path connecting the communication apparatuses on the network in a direction opposite to the relay path originally set;
   a second detecting unit that detects failure occurring in a line included in the relay path switched to by the switching unit; and
   a logical switching unit that, when the second detecting unit detects failure, logically switches the relay path using, among the lines, a line where no failure has been detected.

2. The communication apparatus according to claim 1, wherein
   the second detecting unit, after the switching unit switches the relay path, detects whichever occurs first among: failure occurring in a line included in the relay path switched to by the switching unit, and recovery of the line where the failure has been detected by the first detecting unit, and
   the first detecting unit, when the second detecting unit detects the recovery, detects failure occurring in a line included in the relay path.

3. The communication apparatus according to claim 2, wherein the switching unit, when the second detecting unit detects the recovery, switches the relay path back to the relay path originally set before switching by the switching unit.

4. The communication apparatus according to claim 1, wherein
   the first detecting unit detects failure when a control frame transmitted to a communication apparatus on the network is not received back from the communication apparatus, and
   the second detecting unit detects failure when a control frame transmitted to a communication apparatus on the network is not received back from the communication apparatus.

5. The communication apparatus according to claim 1, wherein the switching unit switches the relay path with the aid of a control frame that is transmitted to a communication apparatus on a first path set as the relay path before switching and that indicates to block the first path, and a control frame that is transmitted to a communication apparatus on a second path set as the relay path after switching and that indicates to release the second path.

6. A path switching method for a network having ring topology and connecting a plurality of communication apparatuses such that adjacent communication apparatuses are connected through a plurality of lines, the path switching method comprising:

- detecting failure occurring in a line that is among the lines and included in a relay path set between communication apparatuses on the network;
- switching the relay path to a relay path connecting the communication apparatuses on the network in a direction opposite to the relay path originally set, when failure is detected at the detecting;
- detecting failure occurring in a first one of the lines included in the relay path switched to at the switching; and
- logically switching the relay path using; a second one of the lines, the second one of the lines being a line where no failure has been detected, when the failure is detected in the first one of the lines.

\* \* \* \* \*

UNITED STATES PATENT AND TRADEMARK OFFICE
CERTIFICATE OF CORRECTION

| | | |
|---|---|---|
| PATENT NO. | : 7,864,668 B2 | Page 1 of 1 |
| APPLICATION NO. | : 12/320658 | |
| DATED | : January 4, 2011 | |
| INVENTOR(S) | : Ko Takatori et al. | |

It is certified that error appears in the above-identified patent and that said Letters Patent is hereby corrected as shown below:

Column 20, Line 9, In Claim 6, delete "using;" and insert --using--, therefor.

Signed and Sealed this

Nineteenth Day of April, 2011

David J. Kappos
*Director of the United States Patent and Trademark Office*